US006865736B2

(12) United States Patent
Holmberg et al.

(10) Patent No.: US 6,865,736 B2
(45) Date of Patent: Mar. 8, 2005

(54) STATIC CACHE

(75) Inventors: Per Anders Holmberg, Stockholm (SE); Peter Norrman, Trångsund (SE); Leif Karl Johansson, Stockholm (SE); Terje Egeland, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 734 days.

(21) Appl. No.: 09/784,070

(22) Filed: Feb. 16, 2001

(65) Prior Publication Data

US 2001/0021959 A1 Sep. 13, 2001

(30) Foreign Application Priority Data

Feb. 18, 2000 (SE) .............................................. 0000533

(51) Int. Cl.[7] ................................................ G06F 9/49
(52) U.S. Cl. ..................... 717/158; 717/159; 711/102
(58) Field of Search ................................ 717/127, 130, 717/151, 154, 158; 711/118, 137; 712/227

(56) References Cited

U.S. PATENT DOCUMENTS

| 3,775,756 | A | * | 11/1973 | Balser ......................... 712/32 |
| 5,537,568 | A |   | 7/1996 | Yanai et al. |
| 5,778,436 | A |   | 7/1998 | Kedem et al. |
| 5,890,205 | A | * | 3/1999 | Grimsrud et al. ........... 711/112 |
| 5,991,871 | A | * | 11/1999 | Zucker ....................... 712/233 |
| 6,003,115 | A | * | 12/1999 | Spear et al. ................ 711/137 |
| 6,189,141 | B1 | * | 2/2001 | Bentez ....................... 717/153 |
| 6,223,339 | B1 | * | 4/2001 | Shah et al. .................. 717/158 |
| 6,327,704 | B1 | * | 12/2001 | Mattson et al. ............. 717/153 |
| 6,381,628 | B1 | * | 4/2002 | Hunt ........................... 709/201 |
| 6,390,922 | B1 | * | 5/2002 | Vange et al. ................. 463/42 |
| 6,662,358 | B1 | * | 12/2003 | Berry et al. ................ 717/128 |
| 6,665,868 | B1 | * | 12/2003 | Knowles et al. ............ 717/178 |

OTHER PUBLICATIONS

Ding et al, Compiler direcetd run time monitoring of program data access, ACM MSP, pp. 1–12, Jun. 2002.*
Park et al, "Compiler assiated demand paging for embaded systems with flash memory", ACM EMSOFT, pp. 114–124, Sep. 2004.*
Chilimbi et al., Cache conscious structure layout, ACM SIGPLAN, pp. 1–12, May 1999.*
Mahapatra et al, "The performance advantages of applying compression to the memory system", ACM MSP, pp. 86–96, Jun. 2002.*

* cited by examiner

*Primary Examiner*—Anil Khatri (57) ABSTRACT

The present invention discloses a processor system comprising a processor (31) and at least a first memory (32) and a second memory (34, 36, 37). The first memory (32) is normally faster than the second one, and means for memory allocation (38, 41, 48) perform the periodically static allocation of data into the first memory (32). The means for memory allocation (38, 41, 48) are run-time updateable by software. An execution profiling section (39) is provided for continuously or intermittently providing execution data used for updating the means for memory allocation (38, 41, 48). According to the invention, the memory allocation is performed on a variable or record (49, 50) level. The means for memory allocation preferably use linking tables (41, 48) supporting dynamic software changes. The first memory (32) is preferably an SRAM, connected to the processor by a dedicated bus (33).

54 Claims, 5 Drawing Sheets

STATIC CACHE

This application claims priority under 35 U.S.C. §§ 119 and/or 365 to 0000533-0 filed in Sweden on Feb. 18, 2000; the entire content of which is hereby incorporated by reference.

TECHNICAL FIELD

The present invention relates to processor technology in general and in particular to memory functionality of a processor.

BACKGROUND

Ever since the first computers, programmers have wanted unlimited amounts of fast memory. The processing times have decreased considerably during recent years, but the access times to different kinds of memories have not developed with the same rate. Already from the beginning of computer science, one has been aware of that certain large advantages can be achieved by organising the memory system in a hierarchy. The use of caches is one of the major performance enhancements of modern microprocessors. The term "cache" is here intended to be used for "the level of the memory hierarchy between the central processing unit and the main memory". One important feature of cache memories is fast storage of certain data, taking advantage of locality of access. The basic principle is thus that important and/or frequently used data should be available in as fast memories as possible.

Most processors today include at least one cache at chip level and many also include multi-level cache systems with external caches built from e.g. one to ten static random access memory (SRAM) chips. The use of multi-level cache systems and the use of large external caches are very well established for processors running general-purpose applications and commercial workloads. However, the use of multi-level cache systems has not been employed for embedded processors (i.e. processors not "visible" for any specific user) and real-time systems to the same degree.

When working with embedded processors and/or real-time systems, some of the disadvantages with cache systems of the prior art become disturbing. There is a lack of determinism, which is particularly troublesome in real-time applications. There are also problems in system maintenance. First, standard multi-level caches present an unpredictable and varying behaviour concerning performance and/or delays. In general-purpose processors this is not noticeable, since there are normally so many different tasks processed, that a comparison form one occasion to the next does not become obvious. Furthermore, in contrary to real-time processors, general-purpose processors do not have any absolute deadline in processing time to meet. However, for embedded processors, a few processes are typically executed repeatedly, and the operation of the system controlled by the embedded processor often relies on the reliability of performance. Well predictable processing times may therefore be of crucial importance for many applications. Since the behaviour of cache systems according to the state of the art typically depends on the recent history of memory use, one and the same process, operated at two different occasions, may present varying processing times. The processing times depend on the recent processing history before the process was started. The performance and delay of a process have to be predictable to a certain extent.

Furthermore, interactions between the cache system and the maintenance of the system, such as background tests or updates in a fault tolerant computer, may considerably change the performance of the cache system. For instance, the execution of a memory test program or the copying of a large memory area for a backup or hardware re-integration can invalidate all content in a cache that is used by the ordinary applications. In real time applications, the performance of a system has to be guaranteed also when maintenance activities of this type are going on.

In the state of the art, there are two main solutions to overcome or reduce the drawbacks described above. One way is to implement the use of a static random access memory (SRAM), and make a division of data between the fast SRAM and the slower memories. The division is visible for the application. Thus, the application developer has to select the data areas that should go into the fast memory, either when writing the code or when configuring the system. This solution might be acceptable for a small application provided that there are few changes in the software or the underlying hardware. For large applications with continuous development and several hardware platforms with different memory configurations, it is in practice impossible to keep up and create optimal configurations for each application and hardware combination.

Furthermore, the introduction of run-time linking for supporting dynamic changes of software in a system, makes it even more difficult for an application developer to select appropriate data for storage in the fast and slow memory areas, respectively. The process of run-time linking or dynamic linking supports program updates during the operation of a processor. In such systems, the program routines and variables are not tied to any specific memory addresses in connection with the compilation. The linking is performed dynamically, in order to allow for updating of program sequences. The actual linking is performed by table look-ups at program calling or access of variables.

Another approach to solve problems with cache unpredictability is to lock entries into the cache. A real-time critical routine is executed and the cache is then locked for keeping the real-time critical routine in the cache. This works well for real-time applications with a single critical routine or a few critical routines, but does not allow for scaling to large applications. In large applications, the worst case behaviour must be guaranteed for a larger code.

In the APZ processor in exchanges from Telefonaktiebolaget Ericsson, SRAM techniques are used for achieving a faster memory access. Entire selected program blocks and associated variable data are moved to an SRAM in the program memory system, depending on the frequency of use. Furthermore, SRAM and DRAM memory boards are mixed in the data memory system, in order to support a division of performance critical and less performance critical data blocks. However, the benefit of such a configuration is limited, since the division is based on a coarse granularity. Program blocks have often sizes in the order of 100 kB and variable/record data blocks could even reach to MB-sizes, which reduces the efficiency of the memory division, since only a few blocks can be accommodated in the faster memory.

The U.S. Pat. No. 6,003,115 discloses a method and apparatus for predictive loading of a cache. This document describes a method of preloading a disk cache by the blocks being most frequently used. The preloading is initiated at certain disk access procedures, e.g. at launch of an executable program code. The preloading takes place in pieces of blocks, the size of which is determined by the size of the disk blocks. Processes of accessing main memories of a RAM type are not applicable.

SUMMARY

A general object of the present invention is to provide a memory configuration and memory handling of random access memories, which eliminate or reduce the above disadvantages. Another object of the present invention is to provide a memory configuration and memory handling, which ensure predictability in program performance. A further object of the present invention is to provide a processor system with possibilities for periodically statically allocating the most performance critical variable/record data and/or instruction data with a fine granularity to fast memory areas in an updateable manner. Yet a further object of the present invention is to use execution profiling as a base of memory allocation updating. Another object of the present invention is to provide a processor system with a static cache memory with low latency.

The above objects are accomplished by systems and methods according to the accompanying claims. In general, the present invention discloses a processor system comprising a processor and at least a first memory and a second memory, both of a random access memory (RAM) type. The first memory is faster than the second one, and means for memory allocation performs an allocation of data of a load module to the first memory. The means for memory allocation is run-time updated by software. An execution profiling section is provided for continuously or intermittently providing execution data concerning behaviours of programs executed in the processor system, which execution data is used for updating the operation of the means for memory allocation. According to the invention, the execution profiling section provides performance characteristics of part entities of the load module, e.g. individual data variables (or records), and/or instructions of a single basic block, instructions of a group of basic blocks or instructions of a single program routine, enabling an allocation of selected part entities to the first memory. The means for memory allocation preferably uses linking tables supporting dynamic software changes. The first memory is preferably an SRAM, connected to the processor by a dedicated bus, or implemented as a memory area located on the processor chip. The first memory may preferably be included in a memory hierarchy, as a second level cache memory. The selection of load modules to be execution profiled is preferably performed according to internal information of an operating system. Most preferably, this selection is performed based on the priority of the program and/or if the program is executed as a maintenance or background job.

The present invention also discloses a method for memory handling, where allocation of data into a fast memory is performed based on run-time updated allocation information. The method further comprises run-time measurements of behaviour of programs executed in the processor system, continuously or intermittently, and software updating of the allocation information based on these results. The measurements of program behaviour comprises measurement of the performance characteristics, preferably the number of accesses, of part entities of load modules which enables the allocation to be made on selected part entities, e.g. individual data variables/records or instructions of a single program routine or a basic block. The allocation to the first memory may comprise data, instructions and references. The allocation is preferably also based on internal information of an operating system, e.g. the size or the type or priority of the programs associated with the load module.

Thus, the present invention provides a memory area, which may be described as a "static cache". One of the main advantages with the present invention is that a fine granularity of the data held by the static cache reduces the necessary memory sizes, or allows for more important data to be held in the static cache. Furthermore, the close arrangement to the processor lowers the access times. The possibility to intermittently update the allocation based on execution profile measurements gives an increased flexibility in the use of the present invention.

According to a second aspect of the invention, the allocation of part entities of a load module is performed based on internal information of an operating system, e.g. the size of the part entities or the type or priority of the programs associated with the load module.

Further advantages and features of the present will be further described in the following description of some embodiments of the present invention.

BRIEF DESCRIPTION OF THE DRAWINGS

The invention, together with further objects and advantages thereof, may best be understood by referring to the following description taken together with the accompanying drawings, in which.

DETAILED DESCRIPTION

The term data will generally refer to all kind of data, such as variable/record data, instruction data, reference data or a combination thereof.

In the following description, the term "variable" or "variable/record data" is used for different types of data, including e.g. a number, a record, a vector or a matrix of numbers. This kind of "variable" is in many applications also referred to as a "record". The terms will in the following description be treated as synonymous words.

Instruction data or program data may comprise instructions, procedures, functions, routines and classes associated with programs, and is referred to as "instruction data" in the following description.

A load module is a quantity of data, both instruction data and associated variable/record data, which is loaded in order to be able to execute a certain program. In a personal computer (PC), this corresponds to an "EXE"-file, in Java, it is named "class file" and in the APZ system it is a "block". The data blocks of a load module may be divided into smaller entities. For variable/record data, the smallest dividable entities are the individual variables or records. For instruction data, a first division can be made at the routine level (routines, functions, procedures, subroutines, methods). However, the routines may be further divided into "basic blocks", which may be defined as a straight sequence of instructions with no other enter or exit points than the beginning and the end, or groups thereof. Finally, the basic blocks may be divided into separate instructions.

In the present disclosure "random access memory" or "RAM" refers to asynchronous SRAM and DRAM, synchronous SRAM and DRAM (SSRAM, SDRAM), burst versions of these such as DDR-SDRAM and similar devices. The important aspect is that individual data or groups of data can be accessed in any order.

Figure 1A:
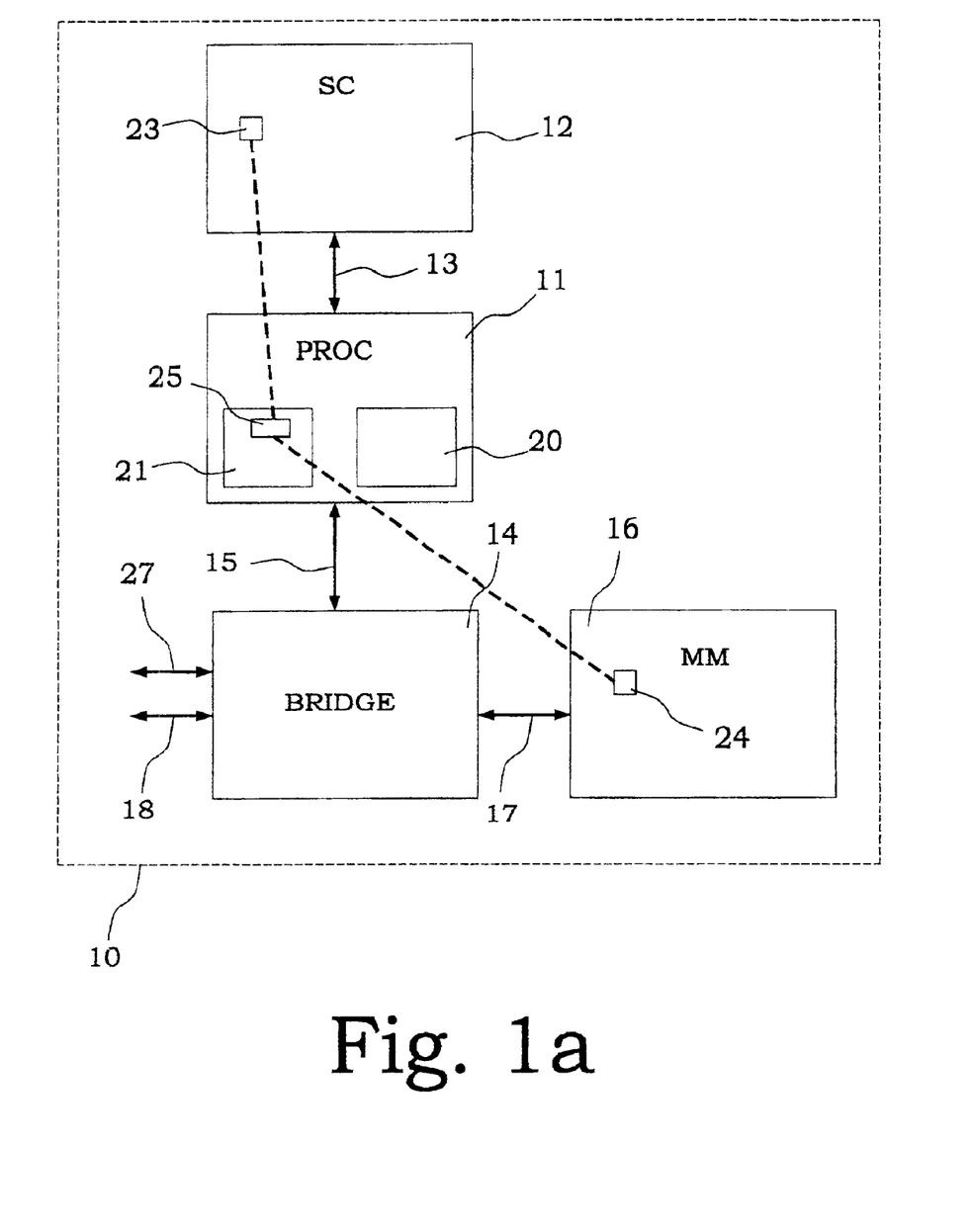
FIG. 1a is a block diagram of an embodiment of a processor system in a general-purpose computer according to the present invention.

FIG. 1a illustrates a configuration of a processor system 10 with a "static cache" memory 12 according to the present invention. The processor system 10 is included in a general-purpose computer. As anyone skilled in the art understands, this description is not intended to be complete concerning the entire function of the processor, but concentrates on parts that are of interest for the present invention. A processor 11 executes the normal operations of the processor system 10. In this embodiment, the static cache 12 comprises a number of high speed SRAMs and is connected to a dedicated port on the processor chip in a similar way as a backside cache, via a dedicated memory bus 13.

Here, the processor 11 has a main processor bus 15 connected to a bridge chip 14. This bridge chip 14 typically includes a memory controller for connection to a main memory 16, via a memory bus 17. The main memory 16 is usually implemented using slower DRAM (dynamic random access memory) circuits. Also, the bridge chip 14 typically connects to a standard I/O bus 27 and a graphics bus 18, e.g. a PCI (Peripheral Component Interconnect) bus and an AGP (Accelerated Graphics Port) bus, respectively.

Having the static cache 12 connected via the dedicated memory bus 13 has certain advantages. The connection is preferably designed for supporting very low latency and very high bandwidth on random access. This means that the SRAM circuits must be connected directly to the processor chip without any intervening logic. The SRAMs have to be located near the processor chip. Only a few loads on each wire are allowed, which gives a limited number of possible connected SRAMs. This gives shorter connections and a lower capacitive load. Furthermore, a special high speed, low voltage swing, electrical interface is used, e.g. an HSTL-II (High Speed Transceiver Logic). This type of connection is similar to the ones used for conventional backside caches in high performance microprocessors. One important difference is, however, that there are generally no cache tags involved in the present "static cache" 12. The use of a separate dedicated bus also makes it possible to optimise the timing for the selected memory circuits. Furthermore, having a separate bus makes it possible to upgrade the interface to newer, high-speed memory interface standards without considering effects on the rest of the processor system design.

Another possibility for implementation of the static cache is to locate it in a memory area directly on the processor chip. This configuration will have most of the advantages as the above described dedicated-bus configuration, only more pronounced. An advantage with such a solution is that the cache memory automatically will be upgraded by upgrading the processor chip.

A memory allocation section 20 in the processor 11 is responsible for the allocation of data to the static cache. The processor 11 also comprises an execution profiling section 21, which continuously or intermittently provides execution data concerning behaviour of programs executed in the processor 11. This execution data is the base, on which the memory allocation section 20 operates. When new execution data is available, the memory allocation section 20 updates its operation in accordance with the provided execution data. Thus, the continuous or intermittent behaviour of the execution profiling section 21 ensures that the system is successively updated to any changes in execution patterns. According to a preferred embodiment of the present invention, an access counter 25, preferably a hardware counter, measures the number of accesses to part entities of a load module, e.g. to a certain variable or record, exemplified by the reference numbers 23 and 24 in FIG. 1a. The access rate is subsequently used to advice the memory allocation section 20 to allocate data into the first memory 12 on a part entity level.

Figure 1B:
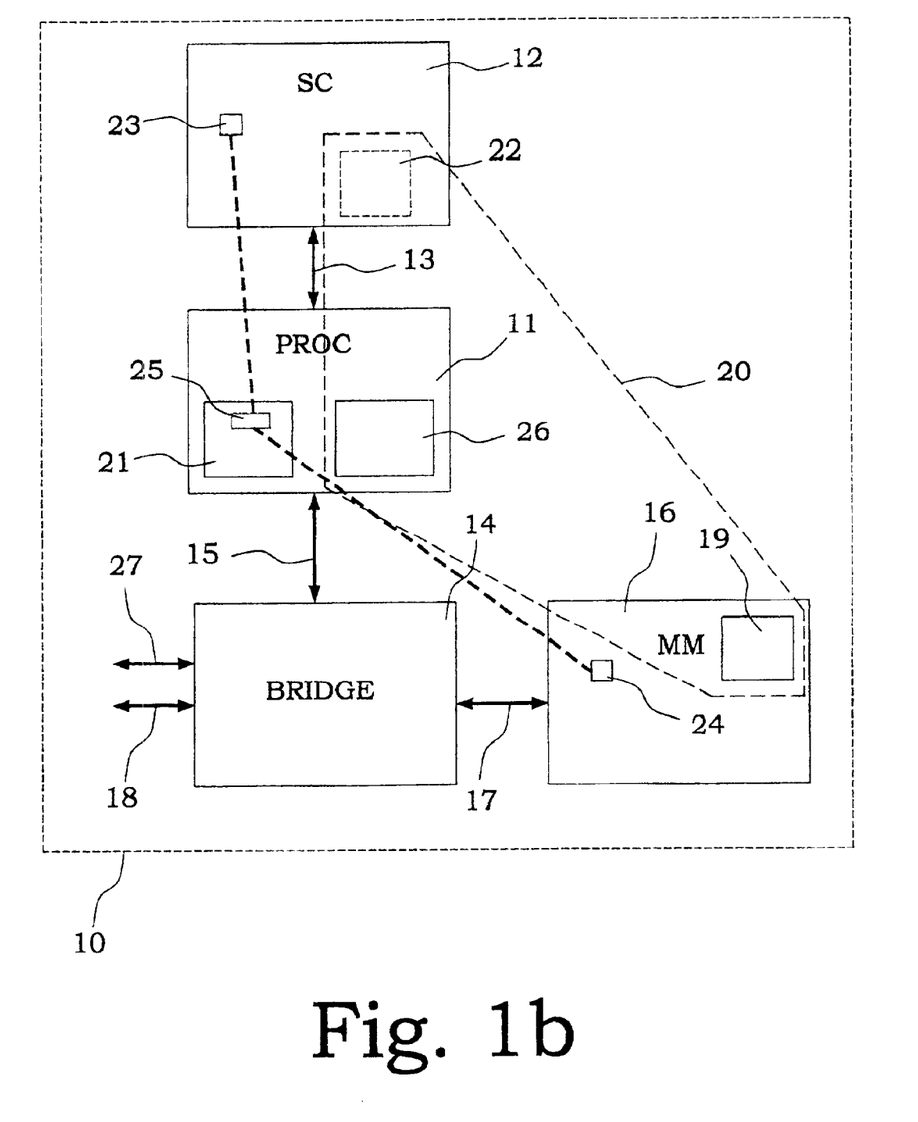
FIG. 1b is a block diagram of another embodiment of a processor system in a general-purpose computer according to the present invention.

In FIG. 1b, another embodiment of the present invention is illustrated. In this embodiment an allocator 26 accesses allocation data 19, preferably in the form of link tables, available in the main memory 16 during the allocation operation. Parts 22 of the link tables 19 or the whole link table 19 may also be placed in the static cache 12, if the number of accesses makes such placement advantageous. Thus, a means for memory allocation 20 may be built by different sections 19, 22, 26 of different parts 16, 12, 11, respectively, in the system 10. The allocator 26 comprises necessary means for updating the link table 19, 22, based on the results provided by the execution profiling section 21.

Figure 2:
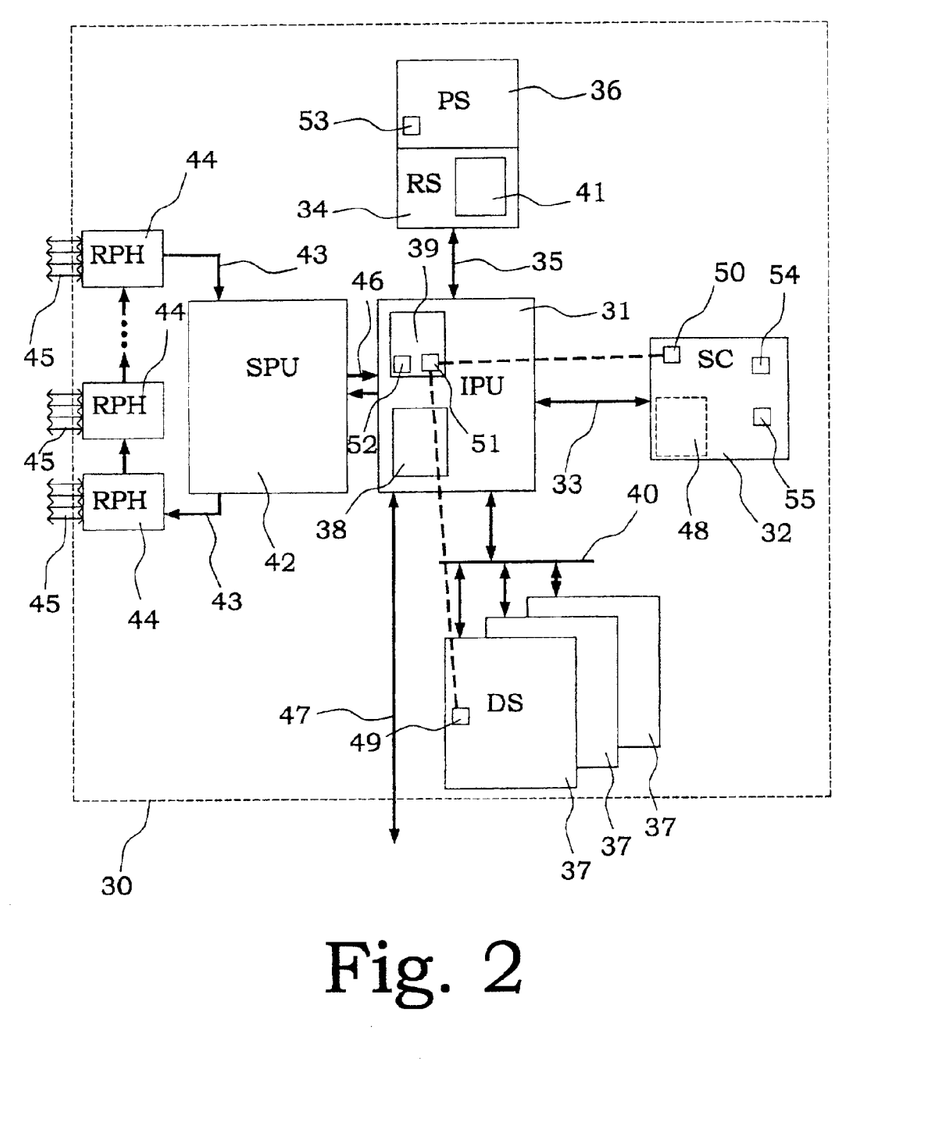
FIG. 2 is a block diagram of a processor system in an embedded computer according to the present invention.

FIG. 2 illustrates a configuration of a processor system 30 with a "static cache" memory 32 according to the present invention. The processor system 30 is included in an embedded computer in a telecommunication system. As anyone skilled in the art understands, this description is not intended to be complete concerning the operation of the system as a whole, but concentrates on parts, which are of interest for the present invention. In the illustrated processor system 30, there are basically two main components; a signal processor unit (SPU) 42 and an instruction processor unit (IPU) 31, interconnected by a bus 46. The SPU 42 handles job level scheduling, in which the order of the jobs to be executed is determined, and the IPU 31 executes the programs of each job. Thus, the IPU 31 performs the real application execution. The SPU 42 performs performance critical, but latency tolerant, operating system functions like process scheduling and I/O protocol termination. Communication to and from the processor units 31, 42 is done via RP-buses 45 (Regional Processor buses). The RP-buses 45 connect to the SPU 42 via a number of RP handlers (RPH) 44 and RPH buses 43 arranged in a ring network.

The IPU 31 is also connected to memories for program storage (PS) 36, variable/record data storage (DS) 37 and reference storage (RS) 34. The reference storage 34 contains control data describing the contents of the two other memories, for example where a program resides and where its different variables are stored. The program store (PS) 36 contains the program blocks, i.e. the instruction data. The reference storage 34 and the program storage 36 are connected to the IPU 31 by a bus 35. The variable/record data storage 37, handling the storage of variables, is located in separate units of one memory, connected by a common memory bus 40. The RS 34, DS 37 and PS 36 are built up from one or many memory circuits. These memories are all large and built up by slow and less expensive DRAM circuits. The IPU 31 also performs different kinds of maintenance operations. Some of them, e.g. memory copying to a redundant processor system, are performed via an interconnection, illustrated by the arrow 47.

A static cache (SC) 32 is according to the present invention connected directly to the IPU 31 by a dedicated bus 33. The dedicated bus 33 is preferably of the same type and connected in the same way as described for the general-purpose computer above.

The IPU comprises an allocator 38, which is responsible for the allocation of data. In order to operate, the allocator 38 uses, as described below, allocation data 41, preferably link tables, available in the reference store 34. It is also possible to have at least a part 48 of the allocation data stored in the static cache 32 itself. An execution profiling section 39 is provided for continuously or intermittently providing execution data concerning behaviour of programs executed in the IPU 31. In this embodiment, the execution profiling section 39 comprises means for measuring the number of accesses to part entities of a load module, e.g. to individual variables or records 49, 50 in either of the memories, preferably a hardware counter 51. In this embodiment, the execution profiling section 39 also comprises a hardware timer 52, which measures the time period, during which the access measurement is performed, more accurately, in order to provide a more reliable access rate. The hardware counters 51 are often difficult to start and stop at a very exact time by using internal operating system clocks. For this reason a timer 52 measuring the real measuring time improves the performance by calibrating the access rate. The functions of the memory allocation section 38 and the execution profiling section 39 are described more in detail below.

In embodiments without a dedicated hardware timer, a software timer, e.g. the clock of the processor may be used. The measurement then takes place during a certain number of clock cycles. Such a solution is, however, less accurate than the solution described above.

Figure 3:
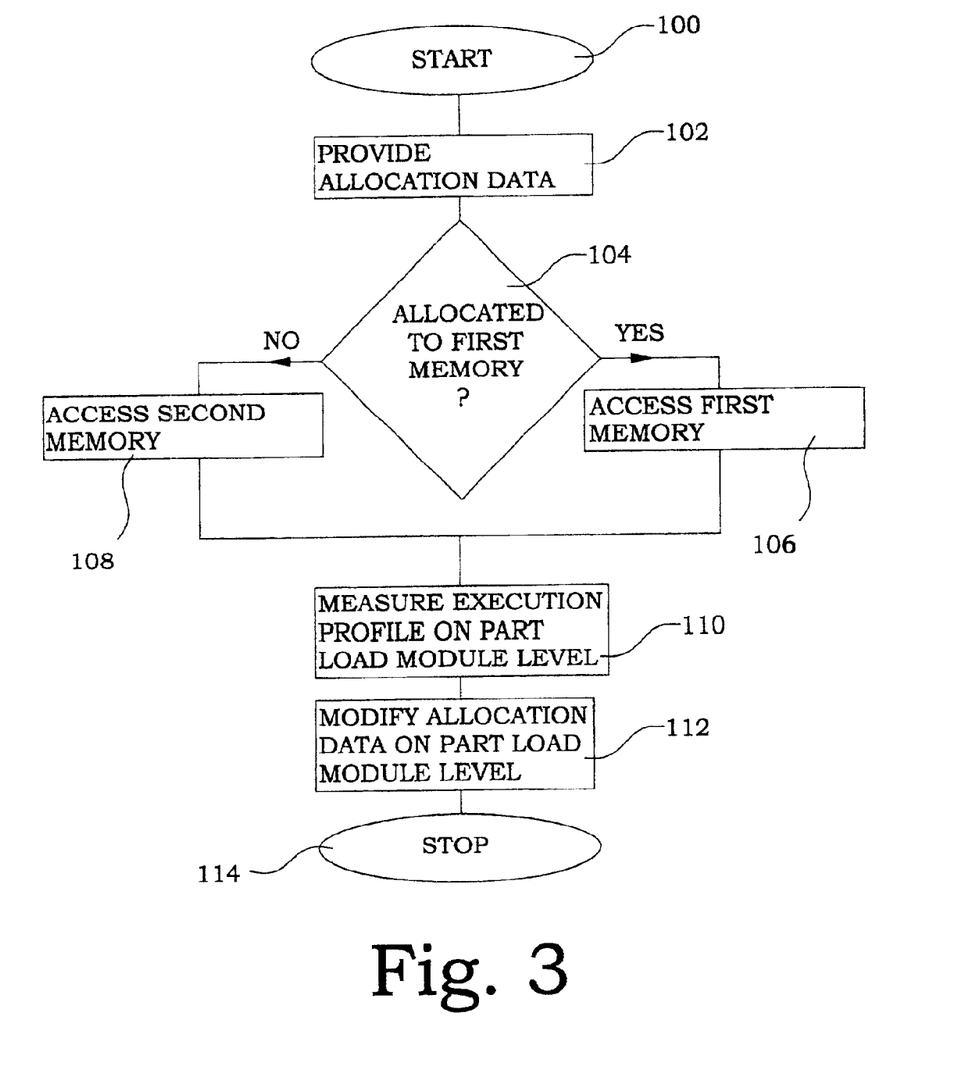
FIG. 3 is a flow diagram of a memory handling procedure.

FIG. 3 illustrates a flow diagram of a general procedure for handling access to a memory in a processor system that comprises at least two memories, and in which the allocation of the data is made according to allocation data. The procedure starts in step 100. In step 102, the allocation data associated with the data packet concerned is read, for example from a link table. The allocation data may e.g. contain a pointer, which points to the actual memory position, or a reference to a certain one of the memories. In step 104, it is decided if the data packet concerned is available in the first memory. If that is the case, the first memory is accessed in step 106 for the data packet concerned. If the data packet concerned instead was available in the second memory, this memory is accessed in step 108.

In view of the present invention, the first memory is the static cache memory. The allocation data preferably consists of link tables, containing pointers to the actual memory positions. The access of the static cache is then performed over the dedicated bus. In cases where the variables contain a multitude of records, an access to an individual record is made by having a pointer to the start of the variable and an offset to find the proper record within the variable.

FIG. 3 further illustrates an allocation updating according to the present invention. In step 110, execution profiles of programs executed in the processor are measured. The outcome of these measurements forms a foundation, on which modified allocation information is constructed, in an automatic manner, controlled by software. The measurements of the execution profiles are performed as background processes or periodical processes, and are performed at a level of part entities of a load module. The used allocation data is in step 112 modified according to these conclusions, whereby the content of the memories is reordered according to the new allocation data. Such allocation is thereby also performed on a level of part entities of a load module, e.g. variable or record level. Areas that are no longer qualified to be held in the static cache are written back to the main memory, while the new data is written into the static cache. The process is ended in step 114.

Anyone skilled in the art understands from the previous description that the allocation updating, i.e. steps 110 and 112, typically is performed periodically or intermittently. A huge number of memory accesses (steps 102 to 108) are thus normally performed between two successive allocation data updates. The flow diagram should thus not be interpreted as a typical flow path, where all steps always are included, but should be considered as a presentation or summary of the characterising steps of the method according to the present invention, without any timing aspects.

Profiling may be performed in several ways. Common methods include code instrumentation, use of hardware counters or including profiling in an emulator or virtual machine.

When instrumenting code for profiling memory accesses, the code, usually the object file or the binary code, is passed through a software filter that inserts extra code around each memory access instruction for collecting profiling statistics. The advantage of this solution is that it does not require any hardware support. The disadvantage is that the inserted code affects performance. This limits the applicability in real-time and high-performance systems.

Hardware counters may, as described in connection with FIG. 2, monitor memory accesses and collect statistics. They are usually built into the processor itself. Depending on the processor used the hardware counter can give more or less detailed information, either counting accesses from specific memory access instructions or directly counting accesses to individual variables.

Another way of designing hardware counters is to have the counter to generate an interrupt, for example, once every 1000th memory access. The interrupt routine then analyses the execution and determines which memory access that was ongoing and collects statistics.

When the software executes on a virtual machine or on an emulator instead of being compiled to native code, then the profiling can be built into the virtual machine or emulator. The emulation of a memory access instruction then includes collection of profiling statistics.

As mentioned above, by using run-time measurements of program behaviour, selection of data to be moved to the static cache is performed. The measurements are performed by software that starts periodically or intermittently and uses e.g. hardware counters, which are arranged to count the number of accesses, and preferably the number of read accesses, to e.g. individual variables, individual instruction routines or individual or groups of basic instruction blocks. After setting up the counters, the software starts a measurement for a certain period of time. The result gives information of which data is used most frequently or which data causes the largest delays. Modification of allocation data may then according to one embodiment be performed in order to favour the allocation of data having the highest number of accesses per time unit and/or per byte to the static cache. Another way of measuring performance characteristics is to measure the time the processor has to wait for a certain variable, allocating the variables causing the largest delays to the static cache. In a memory hierarchy, having the static cache as a second level cache, the measurements may preferably only concern variables associated with cache misses from the first level. As mentioned above, also blocks of instructions 53, normally positioned in the program store 36 (see FIG. 2), may also be measured by the execution profiling section 51. Blocks of instructions 54, which are often executed, may be allocated to the static cache 32 instead. Also, reference tables 55 may be allocated to the static cache 32.

Giving the operating system control of the cache allocation gives a number of advantages. First, the major advantage, compared to just having a fast RAM area or cache locking, is that allocation procedure of program and data to the static cache is automatic. No manual intervention or configuration is needed, whereby the burden on the application developer is reduced. No work for doing SRAM allocation when programming or configuring the system is necessary. This facilitates the program updating and combination with new software, since no mutual considerations have to be made.

The allocation is periodically static, between the occasions of updating the allocation data. Having a periodically static allocation of instruction code data and variable/record data in the cache means that no critical instruction or variable/record data are thrown out due to random behaviour of the code resulting in address conflicts or other cache effects. This in turn gives a predictable behaviour of the performance. The most frequently used data will always be in the static cache, at least for time critical procedures. This predictability is not absolutely valid over an allocation update, where new allocations may be done, but since the overwhelming part of the data, in particular the most used, in the static cache is expected to be unaltered, the predictability is in practice also conserved over an ordinary update. The parts that can be moved to or from the cache depending on variations in application behaviour are the parts near the limit for cache allocation, i.e. the least used ones in cache and the most used one in memory.

The operating system has generally access to useful information about the executable program codes. Such internal information of the operating system may comprise information about the priority of the program and/or whether the program is executed as a maintenance or background job. The internal information of the operating system may also comprise information about sizes of the variables or basic blocks of a program, which information normally is achieved from a load module at loading the program. Further information available for the operating system may be the total load of the system, which provides for e.g. selecting performance measurements only at high-load situations. The operating system may furthermore have information about if the program is real-time critical, or if I/O sequences of the program may influence the program priority. Furthermore, lists or other functions for manual override of the allocation may be provided. All of these different types of information are typical examples of internal information of the operating system.

In ordinary cache designs allocation of data to the cache is based on memory access patterns only. This is the only information available for allocation algorithms implemented in hardware. Data that is frequently used will be placed in the cache, regardless if the data is used for a time critical procedure or a background procedure. In the present invention, allocation can be based not only on access behaviour, but also on e.g. importance of the instruction and variable/record data. This gives an extra possibility to filter out non-important activities. Since the operating system normally has the necessary information, it can be used to make a better allocation choice. For example, the operating system in an embedded processor system normally knows which program blocks that are doing background tests and other maintenance activities. It can do measurements that do not count accesses from these program blocks. Another alternative is to do measurements that discard accesses made from programs running on lower priority levels.

The allocation according to the present invention is performed by software. This means that new algorithms easily could be implemented and even changed when the system is in operation. If a set of algorithms are unsuitable for a certain type of application, as seen from the actual behaviour of the processor system, the software may be changed and provide a better allocation algorithm. This may be advantageous when the program structure of a processor system is changed, or when the pattern of use is changing.

An ordinary cache keeps a cache tag for keeping track of which data that is located in the cache. The cache tag holds the address to the original position in the main memory. In the "static cache" according to the present invention, the tag information is removed. Instead the allocation tables give all necessary address information. Linking information in the form of link tables are preferably used for this purpose. Link tables are already available in machines supporting run-time linking. Run-time linking is described in somewhat more detail below. When a variable according to the execution data is moved to the static cache, then the link is just changed to point to the new location. Similarly, if a variable is moved out from the cache, the link is again changed. The tag-free static cache has a number of advantages. The removed tag gives a reduced need for memory space, giving lower total memory requirements. There is furthermore no need for tag comparison at every memory access, thereby avoiding a performance critical path in many modern processors. There is also no risk for conflict misses and there is no aliasing, which may occur in systems according to the prior art.

Run-time linking is a dynamical way to link different program or data blocks to certain memory positions. For instance, when a call of a program routine is to be made, a descriptor of the program block refers to a link table, and an address in that table. The link table is in turn referring to a program block and an address where information of the start address of the particular program routine may be found. This double reference operation de-couples the addressing in the calling and the called program sequences, which facilitates any changes made at either side. The important feature of the link table for the present invention, is the provision of the reference or pointer to the block and address, where the actual program is to be found. By only changing this pointer to a pointer pointing at the static cache instead, a call will automatically be directed to the static cache, instead of to the ordinary memory. No changes in the calling program block have to be performed. A corresponding procedure can be made in the case of a variable access.

Figure 4A:
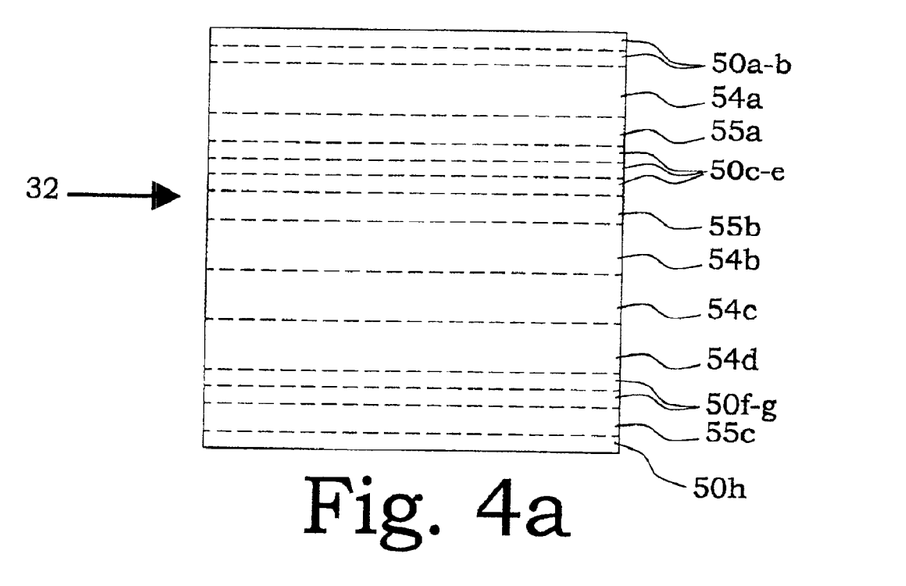
FIG. 4a is a schematic drawing illustrating a static cache memory according to the present invention organised as a combined memory.
Figure 4B:
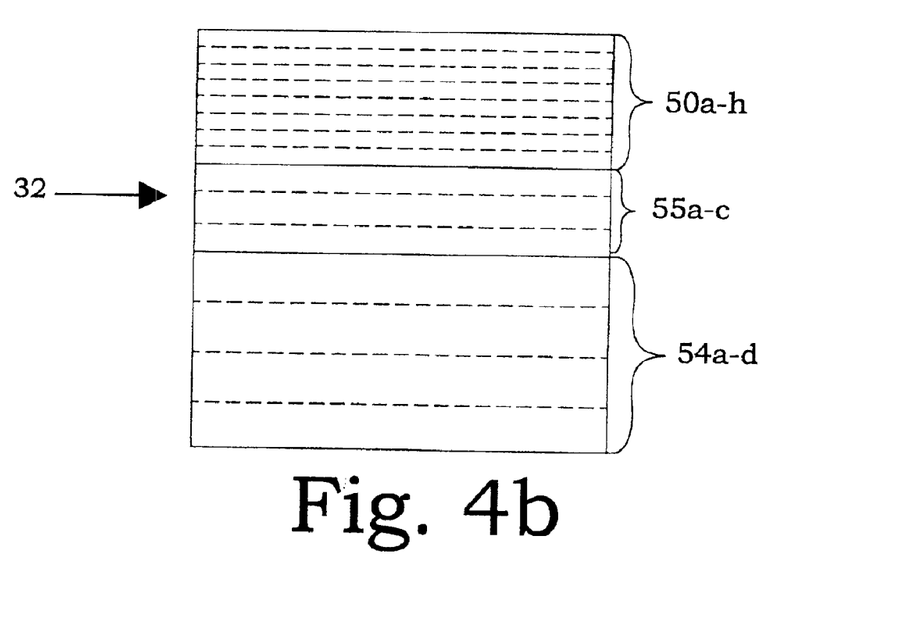
FIG. 4b is a schematic drawing illustrating a static cache memory according to the present invention organised as a split memory.

The static cache according to the present invention is able to store different kinds of data. Instructions 50, variables 54 and tables 55 (e.g. reference tables) (see FIG. 2) are thus all possible objects for storing. As illustrated in FIG. 4a, a unified static cache memory area may be used for storing all these objects, a so called combined cache. Here variables or records 50a–h, instructions 54a–d and tables 55a–c are mixed in one and the same memory. However, solutions, where one or more types of objects have their own memory area, are also possible, i.e. split cache solutions. Such a situation is illustrated in FIG. 4b. Even if the memory is the same, the data are handled differently and stored in separate areas within the static cache. The allocation of these areas is programmable, but is expected to be set when starting the system and not to be changed later. Another alternative would be to have separate caches for different types of information.

The allocation according to the present invention is fine grained. This fine granularity is important to be able to use the advantages of the present invention in an optimal manner. For variables or records, individual ones could be selected. Variables, which are frequently used and connected to a performance critical process, are important to allocate to a "static cache". However, such variables are quite a few, and in order to fit all of them into the static cache, the size of each one of them has to be limited.

Measurements are performed for e.g. one program block or preferably one program routine at a time, counting the number of fetches from the basic block or program routine and the total number of accesses. In other words, measurements are preferably performed on the number of executed instructions or on fetched memory words or instructions. The program routines having the highest number of accesses per time and size are allocated to the static cache. By including instruction data size in the calculations, it is possible for two smaller program routines to get cache allocation instead of one larger program routine, giving an increased total static cache hit ratio. Measurements are set up to count accesses only on capacity critical priorities. Background jobs are not measured and should not be allocated to cache.

A program routine is moved by copying it to the cache and then changing the program start address to point to the new location. This procedure can be repeated periodically or intermittently for detecting changes in program behaviour. Another solution is to periodically or intermittently measure the most used program routines in the main memory to see if they have climbed over the cache threshold and measure the less used program routines in the static cache to see if they have fallen under the current threshold.

When a variable, program or table is moved into the static cache, the reference to the old position in the main memory is lost. Therefore, there is no need for keeping a copy of the data in the main memory. The data can be considered as erased and a free memory space appears. When performing a multitude of new allocations to the static cache, in particular at the first start-up allocation, the remaining data in the main memory will be spread out over a larger area. It is thus advantageous to perform a packing of the remaining data after any larger re-allocations, or periodically.

As discussed above, static cache allocation of pure variable/record data is preferably performed on a per variable basis. Measurements are performed for each variable and the variables having the most accesses per time unit and word are moved to the static cache. In e.g. the APZ processor of Telefonaktiebolaget LM Ericsson, variables are moved by copying them to the new location, and then changing the double word address in the base address table to the new location. In a more general case, this corresponds to the changing of a pointer in the link table. Since variables can be large (e.g. a file with 64K entries) the copying can be done using the double write feature in hardware in a similar way as when doing a memory compactation. When a variable is moved out from the static cache, the variable has to be written back to the main memory. In Java applications, links are provided via information provided by the Constant Pool, which contains descriptions of variables.

The measurements can take considerable time when doing memory allocation on fine grained structures, for example on individual variables, due to the high amount of measurements needed.

There are several ways to cut down the measurement times while still supporting optimal, or near optimal, memory allocation. First, there is a correlation between highly executed code and highly accessed variables, meaning that measurements done on programs and program routines can be used for supporting variable allocation without any measurements on the variables. Secondly, static information about the program routines and the variables, for example the size of the variable, can be used for decreasing the amount of measurements needed.

When the program routines have been measured then all the variables corresponding to the very most used routines can be allocated to cache memory without doing individual measurements on each variable. This can be done for a specific number of routines or for a specific amount of variables or memory area, for example to half the size of the cache memory. Measurements are then performed on remaining variables for allocation of the rest of the memory.

In the same way, variables corresponding to the very least used program routines can be excluded as candidates for cache allocation and does not need to be measured.

Of course, since there is a correlation, the opposite also apply, meaning that measurements on variable usage can be used for selecting program routines for cache allocation.

With static information we mean information that are independent over time and consequently can be derived without actually executing the program, for example, by analysing the load module when loading the program into the computer. One such information is the size of variables and program routines.

For many types of programs a high percentage of the variables are small, allocating only a single or very few bytes or words in the memory. Even if the number of small variables is very high, the total memory area consumed for storing them can still be quite reasonable when comparing to modern cache systems in modern high performance computers designed for applications like telecommunication switches and data base systems and transaction systems. A simplified algorithm can then do cache allocation directly for all small variables without measuring them. Instead, measurements normally have to be done only for larger variables that can be far fewer.

Other types of static information includes program memory addresses and instructions. For example, a compiler or linker can put exception rules at high memory addresses or call exception routines by using special trap instructions. The exception routines can then be identified when loading the program and since they are used only in fault cases they are not candidates for cache allocation and do not need to be measured.

Of course, the first and second of the above described techniques can be combined, for example by immediately allocating to the cache all small variables for the top most used programs.

An essential aspect of cache allocation is to get a high performance after a system start, a system restart or after doing a software change by quickly achieving a near optimum cache allocation. This can be achieved by doing a first allocation using the reduced measurement/non-measurement methods described above and then continue by doing full measurements and switching to a second memory allocation algorithm that considers all collected statistics.

Another way of supporting a fast cache allocation after start and restart is to save the allocation as a part of the restart information. This method is used in the APZ 212 20 processor for allocation of program blocks to the program cache (the instruction cache). This method, however, does not handle the software change case.

The static cache scheme is, as mentioned above, also usable on the program side. In analogy with the variable/record data case, previous allocation in the APZ212 30 of Ericsson is very coarse grained and makes allocation on a PLEX block level. This corresponds to modules or classes in other languages. In the present invention, a more fine grained mechanism operates at least at a routine level (procedures, functions, methods), but may also be performed at an even finer grained level, such as on "basic blocks". A basic instruction block is defined as a straight sequence of instructions with no other enter or exit points than the beginning and the end. In this case, it is possible to use background software to scan through the binary code, determining where routines or basic blocks start and end. The software may then profile the execution. After such a profiling, an allocation is made and the instruction code may be reallocated to the new positions.

The allocation on program routine level is preferred, since it is easiest to implement and has the best potential of giving a performance enhancement in most applications. Routines are normally called by jumps and are therefore rather easy to re-link. In an object oriented language, the call is performed indirectly via a table, which as discussed above simplifies the implementation.

However, in some cases, basic blocks or groups of basic blocks may be suitable for an allocation to the static cache. Since the way to a basic block typically is an execution of a straight code, additional jump instructions have to be added in order to be able to move the basic block. To reduce such an overhead, it is preferred to move groups of basic blocks, if possible.

In analogy with the variable/record data case, relocation is normally dependent on support for run time linking. This is supported in hardware on the APZ processors. Others, like the Java Virtual Machine, usually support it in software as a part of the virtual machine implementation.

The linking information consists of tables describing the memory allocation of each program and data block in the program store and data store. Some often used tables are not so large, e.g. the reference table and GSDT (Global Signal Distribution Table) tables, and the entire table may be allocated to the static cache permanently. Base address tables may preferably be allocated to the static cache on a per block basis in a similar way as program blocks. One allocation algorithm could be that the base address table always follows the block instructions. When the instructions of a block are moved to the instruction static cache, then the base address table of the block is moved to the base address table static cache.

The static cache according to the present invention may also be combined with other configurations of memories and caches. For instance, a multi-level cache system could be configured, where the first level of cache is an ordinary cache and the external second level cache is a static cache according to the present invention. Current state of the art assumes that the same type of cache, with allocation of fixed size cache line based on memory accesses, should be used on both levels. Instead, by combining a small first level standard cache with a second level static cache, the first level cache makes use of the short-term temporal locality and the fine grained spatial locality, while the static cache makes use of longer term and coarse grained spatial behaviour. A multilevel cache system, having a static cache memory in both the first and the second level is also possible, as well as other combinations of static caches and caches according to the state of the art.

It will be understood by those skilled in the art that various modifications and changes may be made to the present invention without departure from the scope thereof, which is defined by the appended claims.

What is claimed is:

1. A processor system comprising: a processor,
a first memory, being of a random access memory type,
a second memory, being of a random access memory type,
memory allocation means for allocation of data of a load module of said second memory to said first memory, said load module comprising variable/record data and/or instruction data,
an execution profiling section for providing execution data concerning behaviour of programs executed in the processor system, continuously or intermittently, whereby the operation of said means for memory allocation is software run-time updated based on said execution data, said execution profiling section in turn comprising at least one means for measuring the performance characteristics of parts of said load module,
whereby said memory allocation means is arranged for allocation of selected parts of said load module to said first memory.

2. The processor system according to claim 1, wherein at least one of said selected parts is an individual variable/record, instructions of a program routine or instructions of a basic block, whereby basic block being defined as a straight sequence of instructions with the beginning and end as the sole enter and exit point, respectively.

3. The processor system according to claim 1, wherein said execution profiling section is arranged to select programs, for which said execution data is to be provided, according to internal information of an operating system.

4. The processor system according to claim 3, wherein said internal information comprises information about the priority of the program and/or whether the program is executed as a maintenance or background job.

5. The processor system according to claim 3, wherein said internal information comprises information about sizes of said parts of said load module.

6. The processor system according to claim 1, wherein said execution profiling section comprises means for measuring the performance for variable/record data or instruction data, and said means for memory allocation comprises means for selecting parts of a load module of both types of data as candidates for being allocated to said first memory, based on said measured performance of said first type of data.

7. The processor system according to claim 1, wherein said means for measuring the performance characteristics comprises means for measuring the number of accesses to parts of said load module.

8. The processor system according to claim 7, wherein said means for measuring the performance characteristics comprises means for measuring the number of read accesses to parts of said load module.

9. The processor system according to claim 7, wherein said means for measuring the performance characteristics comprises a hardware counter.

10. The processor system according to claim 9, wherein said execution profiling section further comprises a timer for calibration of measured performance characteristics.

11. The processor system according to claim 7, wherein said means for measuring the number of accesses is implemented by code instrumentation.

12. The processor system according to claim 7, wherein said means for measuring the number of accesses is implemented in an emulator or virtual machine.

13. The processor system according to claim 1, wherein said means for measuring the performance characteristics comprises means for measuring the waiting time for access to parts of said load module.

14. The processor system according to claim 13, wherein said means for measuring the performance characteristics comprises a hardware counter.

15. The processor system according to claim 14, wherein said execution profiling section further comprises a timer, for calibration of measured performance characteristics.

16. The processor system according to claim 13, wherein said means for measuring the number of accesses is implemented by code instrumentation.

17. The processor system according to claim 13, wherein said means for measuring the number of accesses is implemented in an emulator or virtual machine.

18. The processor system according claim 1, wherein said means for memory allocation is arranged to read a link table.

19. The processor system according to claim 18, wherein at least a part of said link table is allocated to said first memory.

20. The processor system according to claim 18, wherein said link table supports run-time linking.

21. The processor system according to claim 1, wherein said first memory is connected to said processor by a dedicated bus.

22. The processor system according to claim 1, wherein said first memory is implemented in a memory area located on the processor chip.

23. The processor system according to claim 1, wherein said first memory comprises at least one static random access memory.

24. The processor system according to claim 1, further comprising a third memory acting as a first level cache memory, whereby said first memory constitutes a second level cache memory.

25. The processor system according to claim 1, wherein said means for memory allocation operates according to a first algorithm for modifying said allocation data upon start, restart, or software change of the processor system, and according to a second algorithm for modifying said allocation data during steady-state operation of the system.

26. The processor system according to claim 25, wherein said first algorithm is substantially based on information about sizes of parts of said load module.

27. The processor system according to claim 1, wherein the data allocated to said first memory further comprises reference date.

28. The processor system according to claim 1, wherein said first memory is organised as a combined memory for at least two of the following types: variables or records, instructions, and tables.

29. The processor system according to claim 1, wherein said first memory is organised as a split memory for the following types: variables or records, instructions, and tables.

30. A method for memory handling in a processor system, comprising the steps of:
providing allocation data associated with a first set of data of a load module for allocation to a first memory, being of a random access memory type, from a second memory, being of a random access memory type, said load module comprising variable/record data and/or instruction data;
if said first set of data is allocated to said first memory, accessing said first memory for said first set of data;
providing, continuously or intermittently, execution data concerning behaviour of programs executed in said processor system, said step of providing execution data in turn comprising the step of measuring the performance characteristics of parts of said load module;
modifying said allocation data by software in a run-time manner, based on said execution data; and
whereby said allocation data is arranged for allocation of selected parts of said load module to said first memory.

31. The method according to claim 30, wherein at least one of said selected parts is an individual variable/record, instructions of a program routine or instructions of a basic block, whereby basic block being defined as a straight sequence of instructions with the beginning and end as the sole enter and exit point, respectively.

32. The method according to claim 30, wherein said step of providing execution data provides execution data concerning behaviours of programs, selected according to internal information of an operating system.

33. The method according to claim 32, wherein said internal information comprises information about the priority of the program and/or if the program is executed as a maintenance or background job.

34. The method according to claim 32, wherein said internal information comprises information about sizes of said parts of said load module.

35. The method according to claim 30, wherein said step of measuring the performance characteristics comprises the steps of: measuring the performance for a first type of data, variable/record data or instruction data, selecting parts of a load module of both types of data as candidates for being allocated to said first memory, based on said measured performance of said first type of data.

36. The method according to claim 30, wherein said step of measuring the performance characteristics comprises the steps of measuring the number of accesses to parts of said load module.

37. The method according to claim 36, wherein said step of measuring the performance characteristics comprises the steps of measuring the number of read accesses to parts of said load module.

38. The method according to claim 30, wherein said step of measuring the performance characteristics comprises the steps of measuring the waiting time for access to parts of said load module.

39. The method according to claim 30, wherein said step of providing allocation data comprises the step of reading of link tables.

40. The method according to claim 39, wherein said link table supports run-time linking.

41. The method according to claim 30, wherein said step of modification favours allocation of data having the highest measured performance importance per time unit to said first memory.

42. The method according to claim 30, wherein the data allocated to said first memory further comprises reference data.

43. The method according to claim 30, further comprising the step of using a first algorithm for modifying said allocation data upon start or restart of the processor system, and switching to a second algorithm for modifying said allocation data at a later occasion.

44. The method according to claim 43, wherein said first algorithm is substantially based on information about sizes of parts of said load module.

45. The method according to claim 30, further comprising the step of packing the content of a second memory from which data is re-allocated to said first memory, said packing occurring periodically and/or after large re-allocation of data.

46. The method according to claim 30, further comprising the step of run-time updating of said software controlling said modification of said allocation data.

47. A processor system comprising:
- a processor,
- a first memory being of a random access memory type,
- a second memory being of a random access memory type,
- memory allocation means for allocation of data of a load module of said second memory to said first memory, said load module comprising variable/record data and/or instruction data, said memory allocation section being arranged for allocation of selected parts of said load module to said first memory, said selection being based on internal information of an operating system.

48. The processor system according to claim 47, wherein at least one of said selected parts is an individual variable/record, instructions of a program routine or instructions of a basic block, whereby basic block being defined as a straight sequence of instructions with the beginning and end as the sole enter and exit point, respectively.

49. The processor system according to claim 47, wherein said internal information comprises information about the priority of the program and/or information of whether the program is executed as a maintenance or background job.

50. The processor system according to claim 47, wherein said internal information comprises information about sizes of said parts of said load module.

51. A method for memory handling in a processor system, comprising the steps of:
- allocating data associated with a first set of data of a load module into a first memory, being of a random access memory type, from a second memory, being of a random access memory type, said load module comprising variable/record data and/or instruction data, said step of allocating data in turn comprising the step of providing internal information of an operating system regarding parts of said load module, whereby the allocation of data is performed on selected parts; and
- accessing said first memory for said first set of data.

52. The method according to claim 51, wherein at least one or said selected parts is an individual variable/record, instructions of a program routine or instructions of a basic block, whereby basic block being defined as a straight sequence of instructions with the beginning and end as the sole enter and exit point, respectively.

53. The method according to claim 51, wherein said internal information comprises information about the priority of the program and/or if the program is executed as a maintenance or background job.

54. The method according to claim 51, wherein said internal information comprises information about sizes of said parts of said load module.

* * * * *

UNITED STATES PATENT AND TRADEMARK OFFICE
CERTIFICATE OF CORRECTION

PATENT NO. : 6,865,736 B2  Page 1 of 1
APPLICATION NO. : 09/784070
DATED : March 8, 2005
INVENTOR(S) : Holmberg et al.

It is certified that error appears in the above-identified patent and that said Letters Patent is hereby corrected as shown below:

In Column 15, Line 46, in Claim 27, delete "date" and insert -- data --, therefor.

In Column 16, Line 66, in Claim 45, delete "re-allocation" and insert -- re-allocations --, therefor.

In Column 18, Line 15, in Claim 52, delete "or" and insert -- of --, therefor.

Signed and Sealed this

Thirtieth Day of October, 2007

JON W. DUDAS
*Director of the United States Patent and Trademark Office*